(12) United States Patent
Chen

(10) Patent No.: US 9,185,444 B2
(45) Date of Patent: Nov. 10, 2015

(54) VIDEO PLAYBACK SYSTEM WITH MULTIPLE VIDEO DECODERS AND RELATED COMPUTER PROGRAM PRODUCTS

(71) Applicant: Gemtek Technology Co., Ltd., Hsinchu (TW)

(72) Inventor: Hung-Wen Chen, Hsinchu County (TW)

(73) Assignee: GEMTEK TECHNOLOGY CO., LTD., Hsinchu (TW)

( * ) Notice: Subject to any disclaimer, the term of this patent is extended or adjusted under 35 U.S.C. 154(b) by 92 days.

(21) Appl. No.: 13/849,061

(22) Filed: Mar. 22, 2013

(65) Prior Publication Data
US 2014/0165117 A1    Jun. 12, 2014

(30) Foreign Application Priority Data

Dec. 6, 2012  (TW) .............................. 101145814 A

(51) Int. Cl.
| | |
|---|---|
| H04N 21/2387 | (2011.01) |
| H04N 21/266 | (2011.01) |
| H04N 21/433 | (2011.01) |
| H04N 21/472 | (2011.01) |
| H04N 21/63 | (2011.01) |
| H04N 21/6587 | (2011.01) |
| H04N 21/2543 | (2011.01) |
| H04N 21/41 | (2011.01) |
| H04N 21/4227 | (2011.01) |

(52) U.S. Cl.
CPC ....... *H04N 21/2543* (2013.01); *H04N 21/4122* (2013.01); *H04N 21/4227* (2013.01); *H04N 21/4333* (2013.01)

(58) Field of Classification Search
None
See application file for complete search history.

(56) References Cited

U.S. PATENT DOCUMENTS

| | | | |
|---|---|---|---|
| 2011/0126246 A1* | 5/2011 | Thomas ................ | G06F 3/0481 725/93 |
| 2011/0283313 A1* | 11/2011 | Gathen et al. .................... | 725/37 |
| 2012/0159546 A1* | 6/2012 | Klein ............... | H04N 21/43615 725/40 |
| 2014/0366073 A1* | 12/2014 | McCoy ............ | H04N 21/25875 725/109 |

* cited by examiner

*Primary Examiner* — Brian T Pendleton
*Assistant Examiner* — Jean D Saint Cyr
(74) *Attorney, Agent, or Firm* — WPAT, PC; Justin King

(57) ABSTRACT

A video playback system with multiple video decoders includes a content provider server for providing video signals of a target video; a first video decoder; a first display for displaying video content outputted from the first video decoder; a second video decoder; a second display for displaying video content outputted from the second video decoder; a playback control server for controlling the first and the second video decoders; and a mobile communication device for transmitting selection messages to the playback control server via internet and then transmitting modification messages to the playback control server via internet. The playback control server opts to utilize the first video decoder to receive a portion of video signals of the target video according to the selection message, and opts to utilize the second video decoder to receive subsequent video signals of the target video according to the modification message.

28 Claims, 10 Drawing Sheets

VIDEO PLAYBACK SYSTEM WITH MULTIPLE VIDEO DECODERS AND RELATED COMPUTER PROGRAM PRODUCTS

CROSS-REFERENCE TO RELATED APPLICATIONS

This application claims the benefit of priority to Patent Application No. 101145814, filed in Taiwan on Dec. 6, 2012; the entirety of which is incorporated herein by reference for all purposes.

BACKGROUND

The disclosure generally relates to a video playback system and, more particularly, to a video playback system with multiple video decoders and related computer program products.

With the progress of internet, many video playback systems utilizing internet to transmit content of videos have been developed. In existing applications, however, a content service provider typically performs identity authentication and billing procedures with respect to a user based on a single video decoder, such as a set-top box, binding with the user. If the user has installed multiple video decoders of the same content service provider, services provided by different video decoders have to be separately charged, and the same video is not allowed to be successively playbacked in different video decoders.

For example, when a particular video is playbacked to a half by a first video decoder (such as a set-top box connected with a TV in a living room), if the user wants to pause the playback of the particular video and wants to move to another room to utilize a second video decoder (such as a set-top box connected with a TV in a bedroom) to playback remaining portion of the same video, the conventional video playback system is unable to allow the second video decoder to directly jump to the beginning of the remaining portion of the particular video. The user is required to utilize a remote control of the second video decoder to repurchase the particular video, and then utilizes the remote control to fast-forward the particular video to a point where the video was previously paused on the first video decoder. Such an operation is not only troublesome to the user, but also causes the user to be charged twice for the same video by the content service provider.

Additionally, the conventional remote control of the video decoder typically utilizes a directional infrared ray to transmit control signals. Thus, the user has to point a signal emitting terminal of the remote control toward a receiving end of the video decoder precisely in order to manipulate operations of the video decoder. In addition, the video decoder has to be placed within a signal transmission range of the remote control. Otherwise, the video decoder is unable to receive the control signals from the remote control. In other words, the conventional video playback systems only allow the user to use the remote control to manipulate the video decoder within a limited distance, and the user is not allowed to manipulate a video decoder in a remote distance. For example, the user is not allowed to manipulate a video decoder located in another room of the same building or located in another building.

SUMMARY

In view of the foregoing, it can be appreciated that a substantial need exists for a video playback system with different control schemes to solve the aforementioned problems.

An example embodiment of a video playback system with multiple video decoders is disclosed, comprising: a content provider server, configured to operably provide video signals of a target video; a first video decoder, configured to operably communicate with the content provider server via internet; a first display, coupled with the first video decoder and configured to operably display video content outputted from the first video decoder; a second video decoder, configured to operably communicate with the content provider server via internet; a second display, coupled with the second video decoder and configured to operably display video content outputted from the second video decoder; a playback control server, configured to operably control the first and the second video decoders via internet; and a mobile communication device, configured to operably transmit a selection message to the playback control server via internet at a first time point and transmit a modification message to the playback control server via internet at a third time point; wherein the playback control server opts to utilize the first video decoder to receive a portion of video signals of the target video according to the selection message, and opts to utilize the second video decoder to receive subsequent video signals of the target video after the third time point according to the modification message.

Another example embodiment of a computer program product is disclosed. The computer program product is stored in a non-transitory storage device of a playback control server. When the computer program product is executed by a processing circuit of the playback control server, the computer program product enables the playback control server to perform a video playback control operation. The video playback control operation comprises: receiving a selection message transmitted from a mobile communication device via internet at a first time point; opting to utilize a first video decoder to receive a portion of video signals of a target video from a content provider server according to the selection message; receiving a modification message transmitted from the mobile communication device via internet at a third time point; and opting to utilize a second video decoder to receive subsequent video signals of the target video from the content provider server after the third time point according to the modification message.

Another example embodiment of a video playback system with multiple video decoders is disclosed, comprising: a content provider server, configured to operably provide video signals of a target video; a first video decoder, configured to operably communicate with the content provider server via internet; a first display, coupled with the first video decoder and configured to operably display video content outputted from the first video decoder; a second video decoder, configured to operably communicate with the content provider server via internet; a second display, coupled with the second video decoder and configured to operably display video content outputted from the second video decoder; a playback control server, configured to operably control the first and the second video decoders via internet; and a mobile communication device, configured to operably transmit a schedule message to the playback control server via internet at a first time point; wherein the playback control server opts to utilize the first video decoder to receive a portion of video signals of the target video according to the schedule message, and opts to utilize the second video decoder to receive subsequent video signals of the target video after a fourth time point according to the schedule message.

Another example embodiment of a computer program product is disclosed. The computer program product is stored in a non-transitory storage device of a playback control server. When the computer program product is executed by a processing circuit of the playback control server, the computer program product enables the playback control server to perform a video playback control operation. The video playback control operation comprises: receiving a schedule message transmitted from a mobile communication device via internet at a first time point; opting to utilize a first video decoder to receive a portion of video signals of a target video from a content provider server according to the schedule message; and opting to utilize a second video decoder to receive subsequent video signals of the target video from the content provider server after a fourth time point according to the schedule message.

One of the advantages of the aforementioned embodiments is that the same video is allowed to be successively playbacked between the first and the second video decoders and would not cause a user to be charged twice for the same video, thereby effectively improving the convenience of using the video playback system.

Another advantage of the aforementioned embodiments is that a mobile communication device is allowed to manipulate a video decoder in a remote distance through the playback control server, thereby greatly expanding functionality, applicability, and flexibility of the video playback system.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
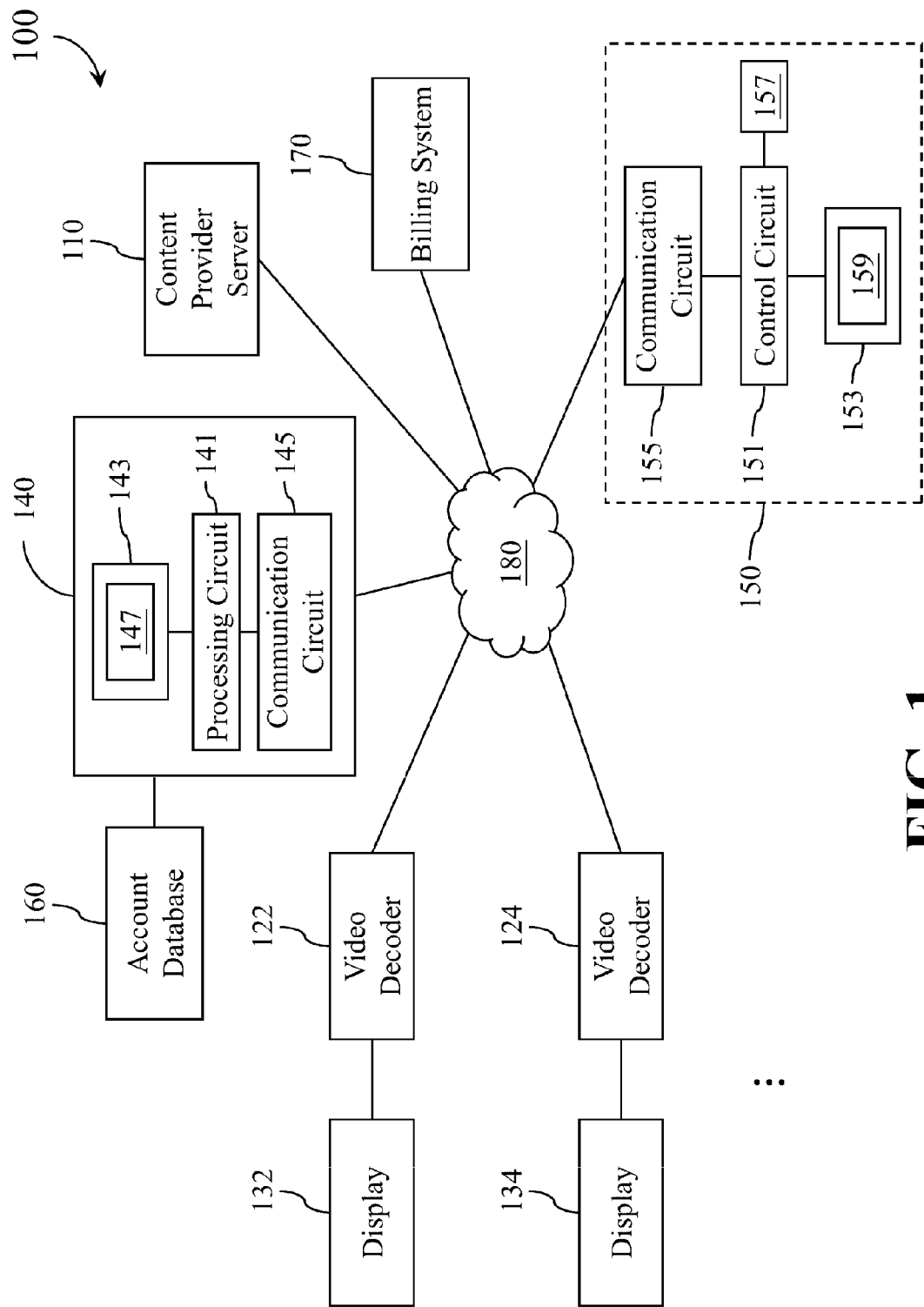
FIG. 1 shows a simplified functional block diagram of a video playback system with multiple video decoders according to one embodiment of the present disclosure.

Please refer to FIG. 1, which shows a simplified functional block diagram of a video playback system 100 with multiple video decoders according to one embodiment of the present disclosure. The video playback system 100 comprises a content provider server 110, multiple video decoders (e.g., the example video decoders 122 and 124 shown in FIG. 1), multiple displays (e.g., the example displays 132 and 134 shown in FIG. 1), a playback control server 140, a mobile communication device 150, an account database 160, and a billing system 170. In this embodiment, the content provider server 110, the video decoders 122 and 124, the mobile communication device 150, and the billing system 170 communicate with the playback control server 140 via the internet 180.

The content provider server 110 is configured to operably provide video signals of a target video. The video decoders 122 and 124 are configured to operably communicate with the content provider server 110 via the internet 180 to receive the video signals transmitted from the content provider server 110. The displays 132 and 134 are respectively coupled with the video decoders 122 and 124, and configured to operably display video content outputted from the video decoders 122 and 124. The playback control server 140 is configured to operably control the video decoders 122 and 124 via the internet 180. The mobile communication device 150 is configured to operably transmit control messages to the playback control server 140 via the internet 180 to select a target video to be playbacked and a receiving device of the video signals of the target video. The playback control server 140 selectively enables the video decoder 122 or 124 to request the content provider server 110 to provide the video signals of the target video according to the control message transmitted from the mobile communication device 150, and instructs the billing system 170 to perform related billing operations.

In the video playback system 100, the mobile communication device 150 plays the role of a remote control of the video decoders 122 and 124, but the mobile communication device 150 indirectly manipulates the video decoders 122 and 124 through the playback control server 140. Additionally, the video signal of the target video selected by the mobile communication device 150 is directly transmitted to the video decoder 122 or 124 from the content provider server 110 via the internet 180, and the playback control server 140 does not act as an intermediate device for transmitting the video signal.

In practical applications, the video decoders 122 and 124 may be located in different spots (such as different rooms) of the same building, or respectively located in different buildings. The video decoders 122 and 124 may be respectively realized with two set-top boxes. Alternatively, the video decoders 122 and 124 may be respectively integrated into the display 132 and the display 134.

As shown in FIG. 1, the playback control server 140 comprises a processing circuit 141, a storage device 143, and a communication circuit 145, wherein both the storage device 143 and the communication circuit 145 are coupled with the processing circuit 141. The storage device 143 is stored with a playback control module 147. In practice, the playback control module 147 may be realized with one or more application program modules, and the storage device 143 may be realized with a volatile memory or a nonvolatile memory. The processing circuit 141 may be realized with one or more processor units. The communication circuit 145 may be a wired communication circuit, a wireless communication circuit, or a hybrid circuit integrated with the functionalities of the above two circuits. For the purpose of explanatory convenience, other components and connections in the playback control server 140 are not shown in FIG. 1. In practice, the playback control server 140 may be realized with multiple servers located in the same geographic region, or may be realized with multiple servers located in different geographic regions.

In the embodiment of FIG. 1, the mobile communication device 150 comprises a control circuit 151, a storage device 153, a communication circuit 155, and an input device 157, wherein the storage device 153, the communication circuit 155, and the input device 157 are coupled with the control circuit 151. In practice, the control circuit 151 may be realized with one or more processor units. The communication circuit 155 may be a wired communication circuit, a wireless communication circuit, or a hybrid circuit integrated with the functionalities of the above two circuits. The input device 157 may be a touch screen, a touch pad, a keyboard, a mouse, a voice control device, or various combinations of aforementioned devices. Additionally, the storage device 153 is stored with a video remote control module 159. The video remote control module 159 may be realized with one or more application program modules.

In applications, the mobile communication device 150 may be any mobile electronic device having networking capability, such as a cell phone, a tablet computer, a notebook computer, a netbook computer, an E-book, or a handheld game console, or the like. For the purpose of explanatory convenience, other components and connections in the mobile communication device 150 are not shown in FIG. 1.

The operations of the video playback system 100 will be further described in the following with reference to FIG. 2 and FIG. 3.

Figure 2:
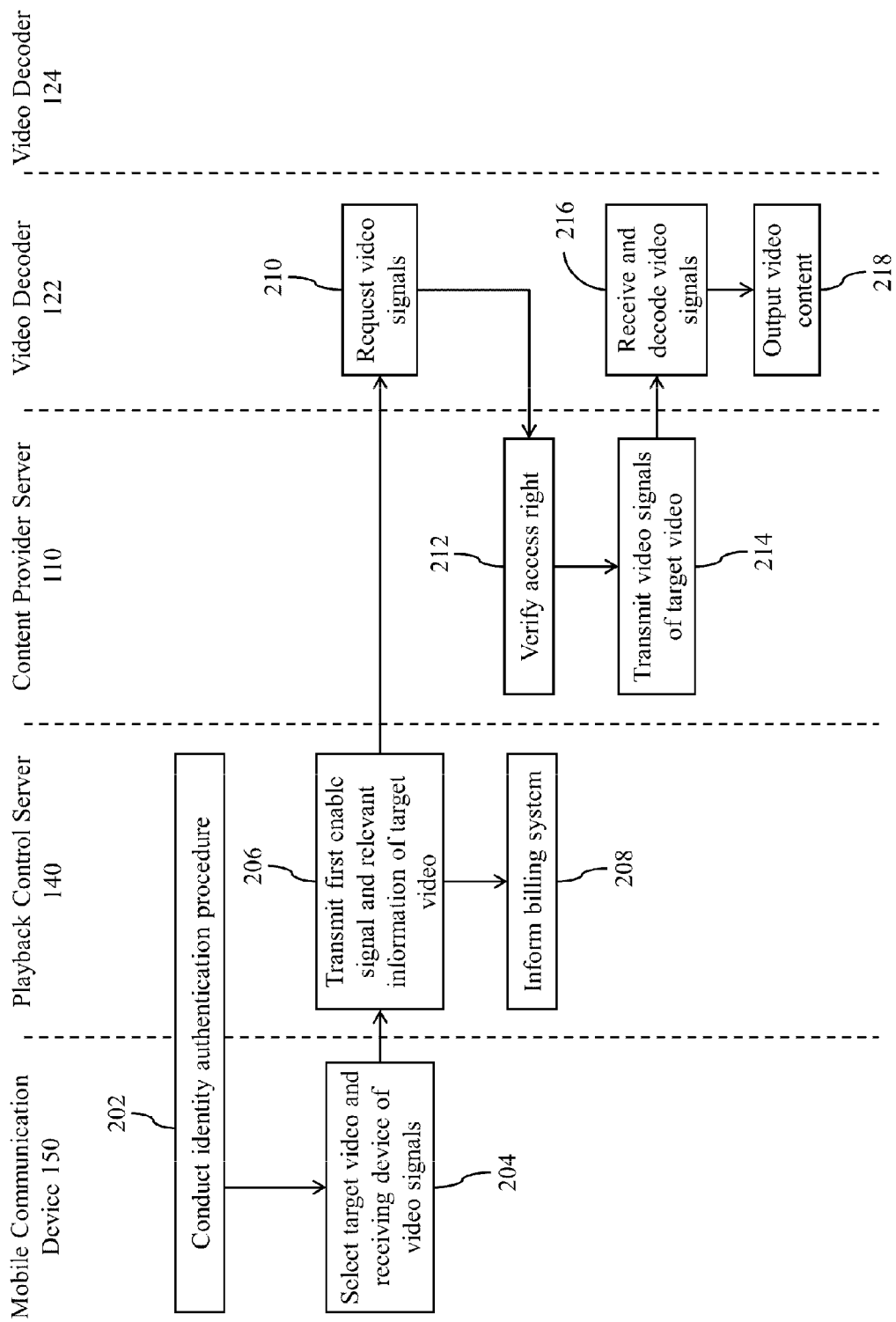
FIGS. 2~3 show simplified flowcharts illustrating a video playback control method according to a first embodiment of the present disclosure.
Figure 3:
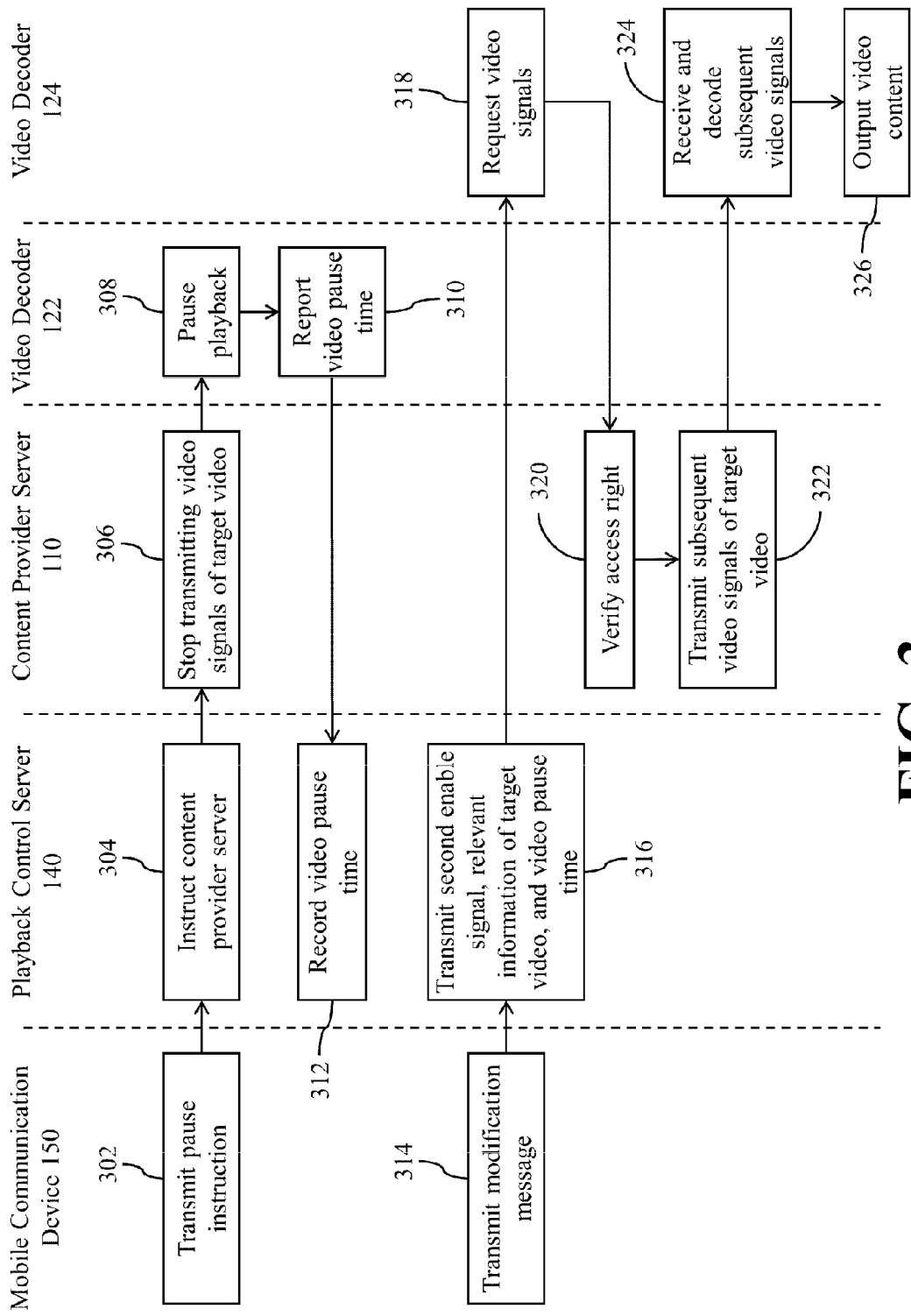

FIGS. 2~3 show simplified flowcharts illustrating a video playback control method adopted by the video playback system 100 according to a first embodiment of the present disclosure. In FIGS. 2~3, operations within a column under the name of a specific device are operations to be performed by the specific device. For example, in FIG. 2, operations within a column under the label "playback control server 140" are operations to be performed by the playback control server 140, operations within a column under the label "video decoder 122" are operations to be performed by the video decoder 122, and so forth. The same analogous arrangement also applies to the subsequent flowcharts.

When an user of the mobile communication device 150 wants to watch a video or set a playback schedule of the video, the user may utilize the input device 157 of the mobile communication device 150 to instruct the control circuit 151 to execute the video remote control module 159, so as to enable the mobile communication device 150 to perform some or all operations in the corresponding column in FIG. 2 and FIG. 3. The processing circuit 141 of the playback control server 140 executes the playback control module 147, so as to enable the playback control server 140 to perform some or all operations in the corresponding column.

In an operation 202, the playback control server 140 and the mobile communication device 150 conduct an identity authentication procedure via the internet 180. When performing the identity authentication, the playback control server 140 may generate related identity inquiry web pages to prompt the user of the mobile communication device 150 to input identity authentication data, such as cell phone numbers, an alias of the user, or identification numbers, and corresponding passwords. Then, the playback control server 140 may compare the identity authentication data transmitted from the mobile communication device 150 with files stored in the account database 160. When the identity authentication data matches with the files in the account database 160, the mobile communication device 150 passes the identity authentication procedure. Otherwise, the playback control server 140 transmits an error message indicating that the identity authentication is failed to the mobile communication device 150.

Additionally, the playback control server 140 may also request the user of the mobile communication device 150 to input a device identification code of the mobile communication device 150, such as the SIM card numbers or device codes of the mobile communication device 150, in the operation 202. The playback control server 140 then compares the device identification code of the mobile communication device 150 with the files stored in the account database 160 to increase the security level of the identity authentication procedure.

After the mobile communication device 150 passes the identity authentication procedure, the video remote control module 159 of the mobile communication device 150 requests the user to utilize the input device 157 to select a target video to be playbacked and a receiving device of the video signals of the target video. After completing the aforementioned selection, the video remote control module 159 performs an operation 204 at a first time point T1 to utilize the communication circuit 155 to transmit a selection message indicating the selected target video and the receiving device of the video signals to the playback control server 140 via the internet 180. For the purpose of explanatory convenience in the following descriptions, it is assumed herein that the selection message indicates that the video decoder 122 is selected to be the receiving device of the video signals of the target video.

In an operation 206, the playback control module 147 of the playback control server 140 utilizes the communication circuit 145 to receive the selection message transmitted from the mobile communication device 150. The playback control module 147 opts to utilize the video decoder 122 to receive a portion of the video signals of the target video according to the selection message. Accordingly, in the operation 206, the playback control module 147 utilizes the communication circuit 145 to transmit a first enable signal EN1 and relevant information of the target video to the video decoder 122 via the internet 180. In one embodiment, the aforementioned relevant information of the target video comprises a video ID of the target video. In another embodiment, the aforementioned relevant information of the target video further comprises purchaser information of the target video, such as the SIM card numbers of the mobile communication device 150 or the like.

In an operation 208, the playback control module 147 utilizes the communication circuit 145 to inform the billing system 170 of a purchasing record of the mobile communication device 150 with respect to the target video via the internet 180, so that the billing system 170 updates billing records of the mobile communication device 150 according to the received purchasing record.

When the first enable signal EN1 and the relevant information of the target video are received by the video decoder 122, the video decoder 122 performs an operation 210 to request the content provider server 110 to provide the video signals of the target video via the internet 180. In practice, when the video decoder 122 requests the content provider server 110 to provide the video signals of the target video, the video decoder 122 may transmit the aforementioned relevant information of the target video to the content provider server 110.

In an operation 212, the content provider server 110 verifies the access right of the video decoder 122. For example, the content provider server 110 may inquire the playback control server 140 or the billing system 170 about whether or not the mobile communication device 150 corresponding to the video decoder 122 has purchased the target video. If the content provider server 110 ensures that the video decoder 122 has the access right of the target video, the content provider server 110 performs an operation 214 to transmit the video signals of the target video to the video decoder 122 via the internet 180.

In an operation 216, the video decoder 122 receives and decodes the video signals of the target video.

In an operation 218, the video decoder 122 outputs the decoded video content to the display 132 to playback the target video.

While the target video is being playbacked by the video decoder 122 and the display 132, if the user of the mobile communication device 150 wants to pause the playback of the target video and wants to utilize the video decoder 124 and the display 134 to playback remaining portion of the target video at another place, the user may utilize the video remote control module 159 to perform an operation 302 at a second time point T2 to transmit a pause instruction to the playback control server 140 via the internet 180.

When the pause instruction transmitted from the mobile communication device 150 is received by the playback control module 147, the playback control module 147 performs an operation 304 to send an instruction to the content provider server 110 via the internet 180.

When the instruction transmitted from the playback control server 140 is received by the content provider server 110, the content provider server 110 performs an operation 306 to stop transmitting the video signals of the target video to the video decoder 122 and instructs the video decoder 122 to pause the playback of the target video.

When receiving the instruction transmitted from the content provider server 110, the video decoder 122 performs an operation 308 to pause the playback of the target video.

Then, the video decoder 122 performs an operation 310 to directly report a video pause time of the target video to the playback control server 140 via the internet 180.

In an operation 312, the playback control module 147 records the received video pause time.

After the user of the mobile communication device 150 utilizes the input device 157 to change the receiving device of the video signals of the target video to the video decoder 124, the video remote control module 159 performs an operation 314 at a third time point T3 to utilize the communication circuit 155 to transmit a modification message to the playback control server 140 via the internet 180, so as to instruct the playback control server 140 to change the receiving device of the video signals.

Then, in an operation 316, the playback control module 147 of the playback control server 140 utilizes the communication circuit 145 to receive the modification message transmitted from the mobile communication device 150. After the third time point T3, the playback control module 147 opts to utilize the video decoder 124 to receive subsequent video signals of the target video according to the modification message. Accordingly, in the operation 316, the playback control module 147 utilizes the communication circuit 145 to transmit a second enable signal EN2, the relevant information of the target video, and the video pause time to the video decoder 124 via the internet 180. In one embodiment, the relevant information of the target video comprises the video ID of the target video. In another embodiment, the aforementioned relevant information of the target video further comprises the purchaser information of the target video, such as the SIM card numbers of the mobile communication device 150 or the like.

In this embodiment, as long as a time difference between a time point at which the modification message transmitted from the mobile communication device 150 is received by the playback control server 140 and a time point at which the selection message transmitted from the mobile communication device 150 is received by the playback control server 140 does not exceed a predetermined time length, such as 48 hours or 72 hours, the playback control module 147 would not treat the aforementioned modification message as another chargeable purchase. Accordingly, the playback control module 147 would not instruct the billing system 170 to add another purchasing record chargeable to the user of the mobile communication device 150, and thus the user would not be charged twice for the target video by the content service provider.

When the second enable signal EN2, the relevant information of the target video, and the video pause time are received by the video decoder 124, the video decoder 124 performs an operation 318 to request the content provider server 110 to provide the video signals of the target video via the internet 180. In practice, when the video decoder 124 requests the content provider server 110 to provide the video signals of the target video, the video decoder 124 may transmit the aforementioned relevant information of the target video and the video pause time to the content provider server 110.

In an operation 320, the content provider server 110 verifies the access right of the video decoder 124. For example, the content provider server 110 may inquire the playback control server 140 or the billing system 170 about whether or not the mobile communication device 150 corresponding to the video decoder 124 has purchased the target video. If the content provider server 110 ensures that the video decoder 124 has the access right of the target video, the content provider server 110 performs an operation 322 to transmit the subsequent video signals of the target video to the video decoder 124 via the internet 180.

In an operation 324, the video decoder 124 receives and decodes the subsequent video signals of the target video.

In an operation 326, the video decoder 124 outputs the decoded video content to the display 134 to playback the remaining portion of the target video.

It can be appreciated from the foregoing descriptions that in the video playback system 100, the user is enabled to indirectly control the video decoders 122 and 124 through the playback control server 140 by using a single mobile communication device 150. The mobile communication device 150 communicates with the playback control server 140 via the internet 180, and the playback control server 140 also communicates with the video decoders 122 and 124 via the internet 180. Accordingly, the user of the mobile communication device 150 is enabled to manipulate the video decoders 122 and 124 even if the mobile communication device 150 is located far away from the video decoders 122 and 124. As a result, the applications and the operational flexibility of the video playback system 100 can be effectively expanded.

Additionally, the video playback system 100 enables the same target video to be successively playbacked by the video decoders 122 and 124. This not only greatly improves the convenience of using the video playback system 100, but also prevents the user of the mobile communication device 150 from being charged redundantly.

Figure 4:
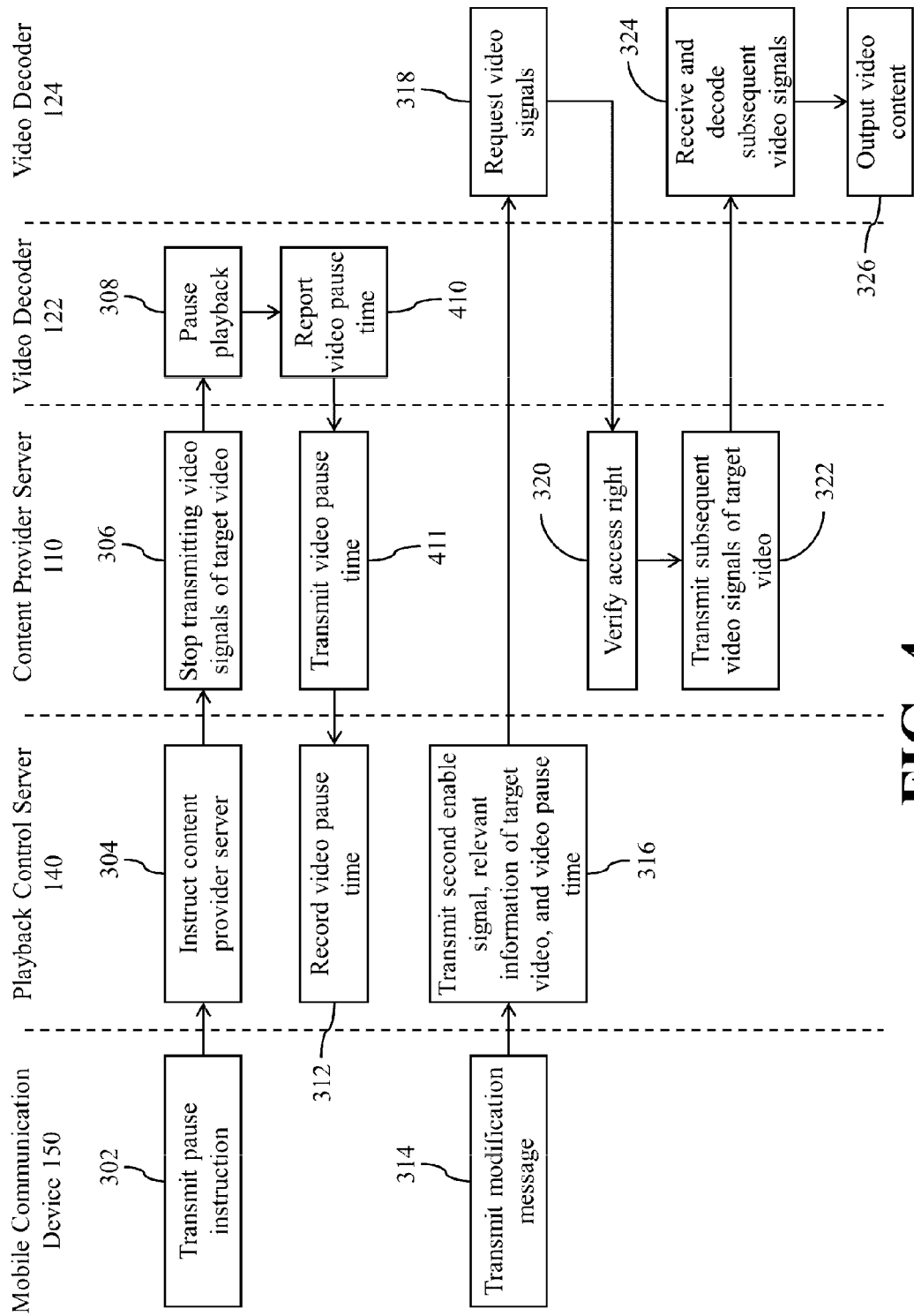
FIG. 4 shows a simplified partial flowchart illustrating a video playback control method according to a second embodiment of the present disclosure.

Please refer to FIG. 4, which shows a simplified partial flowchart of a video playback control method according to a second embodiment of the present disclosure. The flowchart of FIG. 4 is similar to the aforementioned flowchart of FIG. 3, and the difference between the two embodiments is in that the operation 310 in FIG. 3 is replaced by operations 410 and 411 in FIG. 4.

In the operation 410, the video decoder 122 reports the video pause time of the target video to the content provider server 110 via the internet 180.

In the operation 411, the content provider server 110 transmits the received video pause time to the playback control server 140 via the internet 180.

In other words, in the embodiment of FIG. 4, the video pause time of the target video is indirectly reported to the playback control server 140 from the video decoder 122 through the content provider server 110.

Other operations in FIG. 4 are the same as the corresponding operations in FIG. 3, and thus the descriptions regarding the operations and advantages of other operations in FIG. 3 are also applicable to the embodiment of FIG. 4.

Figure 5:
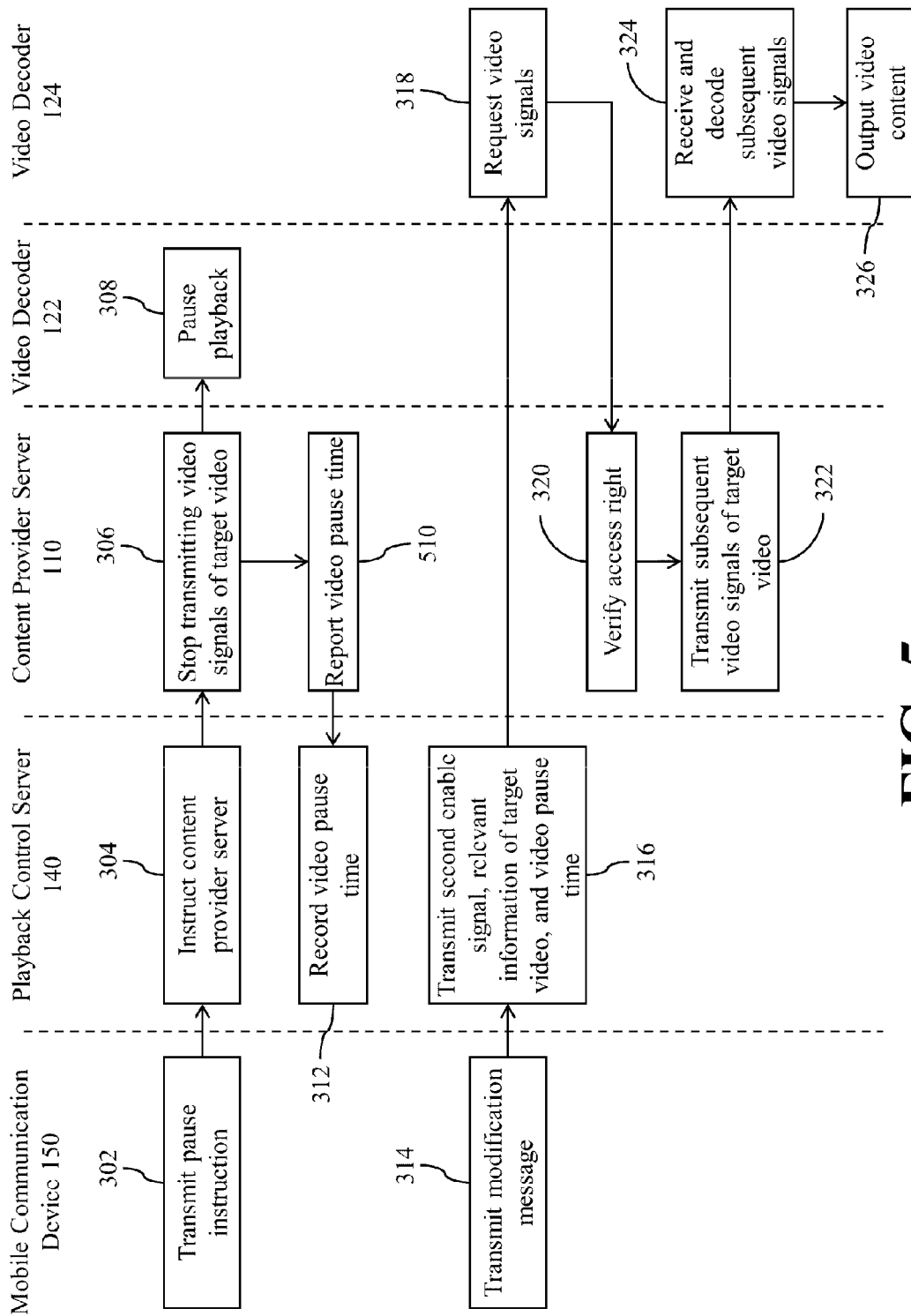
FIG. 5 shows a simplified partial flowchart illustrating a video playback control method according to a third embodiment of the present disclosure.

Please refer to FIG. 5, which shows a simplified partial flowchart of a video playback control method according to a third embodiment of the present disclosure. The flowchart of FIG. 5 is similar to the aforementioned flowchart of FIG. 3, and the difference between the two embodiments is in that the operation 310 in FIG. 3 is replaced by an operation 510 in FIG. 5.

In the embodiment of FIG. 5, the content provider server 110 performs the operation 510 after the operation 306 to report the video pause time of the target video to the playback control server 140 via the internet 180. That is, in the embodiment of FIG. 5, the video pause time of the target video is generated and reported to the playback control server 140 by the content provider server 110.

Other operations in FIG. 5 are the same as the corresponding operations in FIG. 3, and thus the aforementioned descriptions regarding the operations and advantages of other operations in FIG. 3 are also applicable to the embodiment of FIG. 5.

Figure 6:
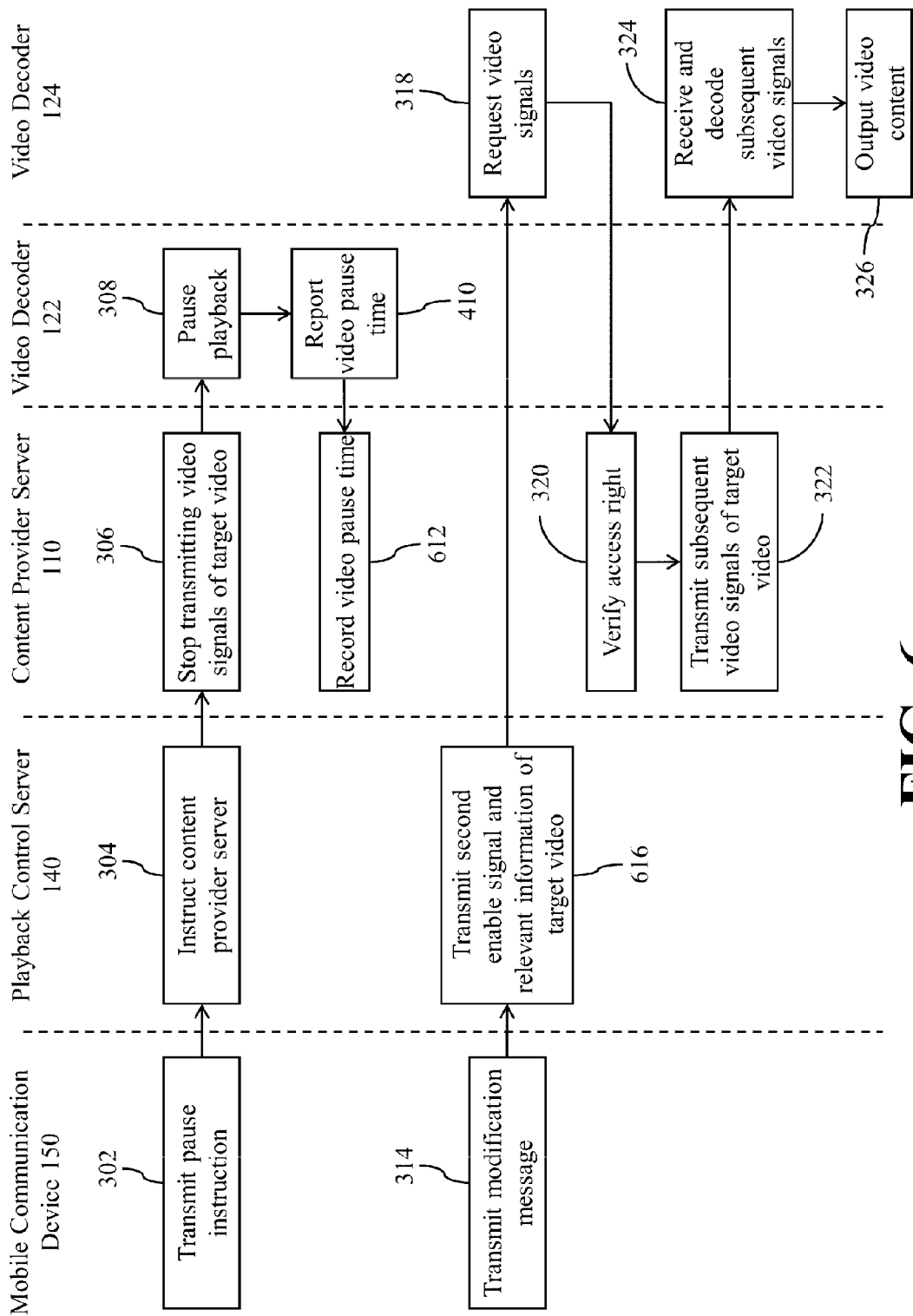
FIG. 6 shows a simplified partial flowchart illustrating a video playback control method according to a fourth embodiment of the present disclosure.

Please refer to FIG. 6, which shows a simplified partial flowchart of a video playback control method according to a fourth embodiment of the present disclosure. The flowchart of FIG. 6 is similar to the aforementioned flowchart of FIG. 4, and the difference between the two embodiments is in that the operations 411 and 312 in FIG. 4 are replaced by an operation 612 in FIG. 6. Additionally, the operation 316 in FIG. 4 is also replaced by an operation 616 in FIG. 6.

In the embodiment of FIG. 6, when the video pause time transmitted from the video decoder 122 is received by the content provider server 110, the content provider server 110 performs the operation 612 to record the received video pause time but does not transmit the received video pause time to the playback control server 140.

In the operation 616, the playback control module 147 of the playback control server 140 utilizes the communication circuit 145 to receive the modification message transmitted from the mobile communication device 150. Similarly, after the third time point T3 the playback control module 147 opts to utilize the video decoder 124 to receive the subsequent video signals of the target video according to the modification message. Since the video pause time of the target video has been recorded in the content provider server 110, the playback control module 147 utilizes the communication circuit 145 to transmit the second enable signal EN2 and the relevant information of the target video to the video decoder 124 via the internet 180 in the operation 616 but does not transmit the video pause time of the target video to the video decoder 124.

Other operations in FIG. 6 are the same as the corresponding operations in FIG. 4, and thus the aforementioned descriptions regarding the operations and advantages of other operations in FIG. 4 are also applicable to the embodiment of FIG. 6.

Figure 7:
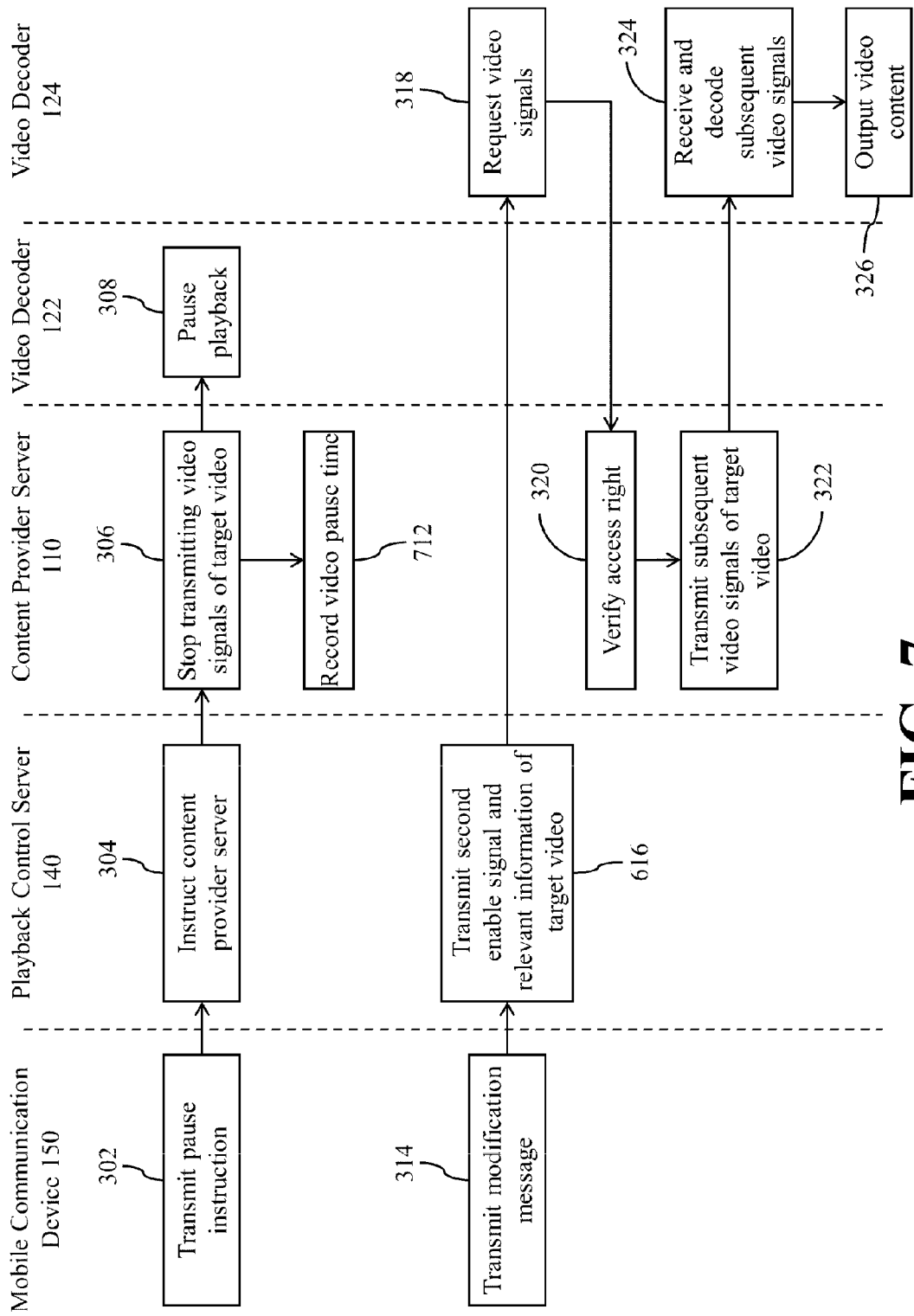
FIG. 7 shows a simplified partial flowchart illustrating a video playback control method according to a fifth embodiment of the present disclosure.

Please refer to FIG. 7, which shows a simplified partial flowchart of a video playback control method according to a fifth embodiment of the present disclosure. The flowchart of FIG. 7 is similar to the aforementioned flowchart of FIG. 6, and the difference between the two embodiments is in that the operation 612 in FIG. 6 is replaced by an operation 712 in FIG. 7.

In the embodiment of FIG. 7, the video pause time of the target video is determined by the content provider server 110. Accordingly, when the content provider server 110 stops transmitting the video signals of the target video to the video decoder 122, the content provider server 110 further performs the operation 712 to record the video pause time of the target video and does not transmit the video pause time of the target video to the playback control server 140.

Other operations in FIG. 7 are the same as the corresponding operations in FIG. 6, and thus the aforementioned descriptions regarding the operations and advantages of other operations in FIG. 6 are also applicable to the embodiment of FIG. 7.

Figure 8:
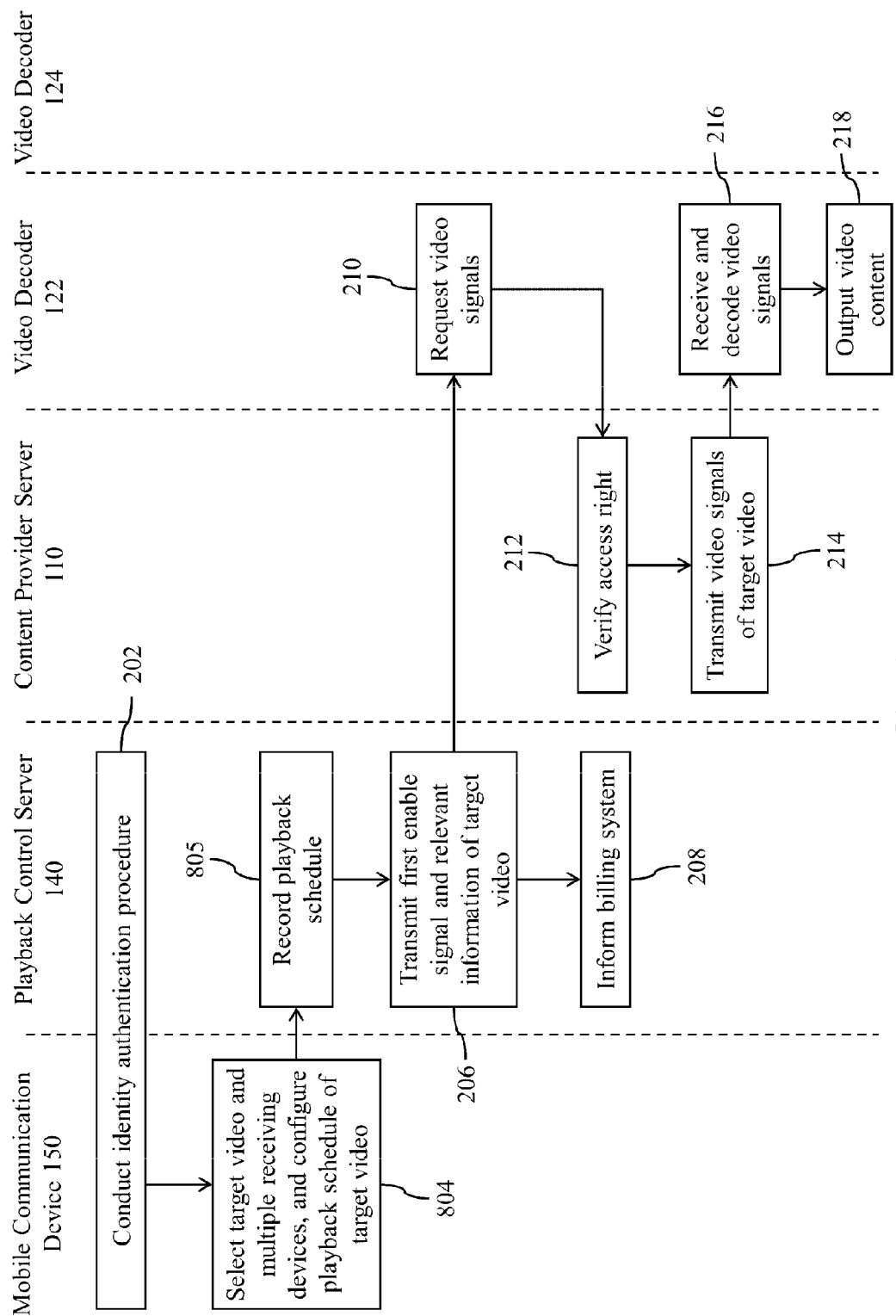
FIGS. 8~9 show simplified flowcharts illustrating a video playback control method according to a sixth embodiment of the present disclosure.
Figure 9:
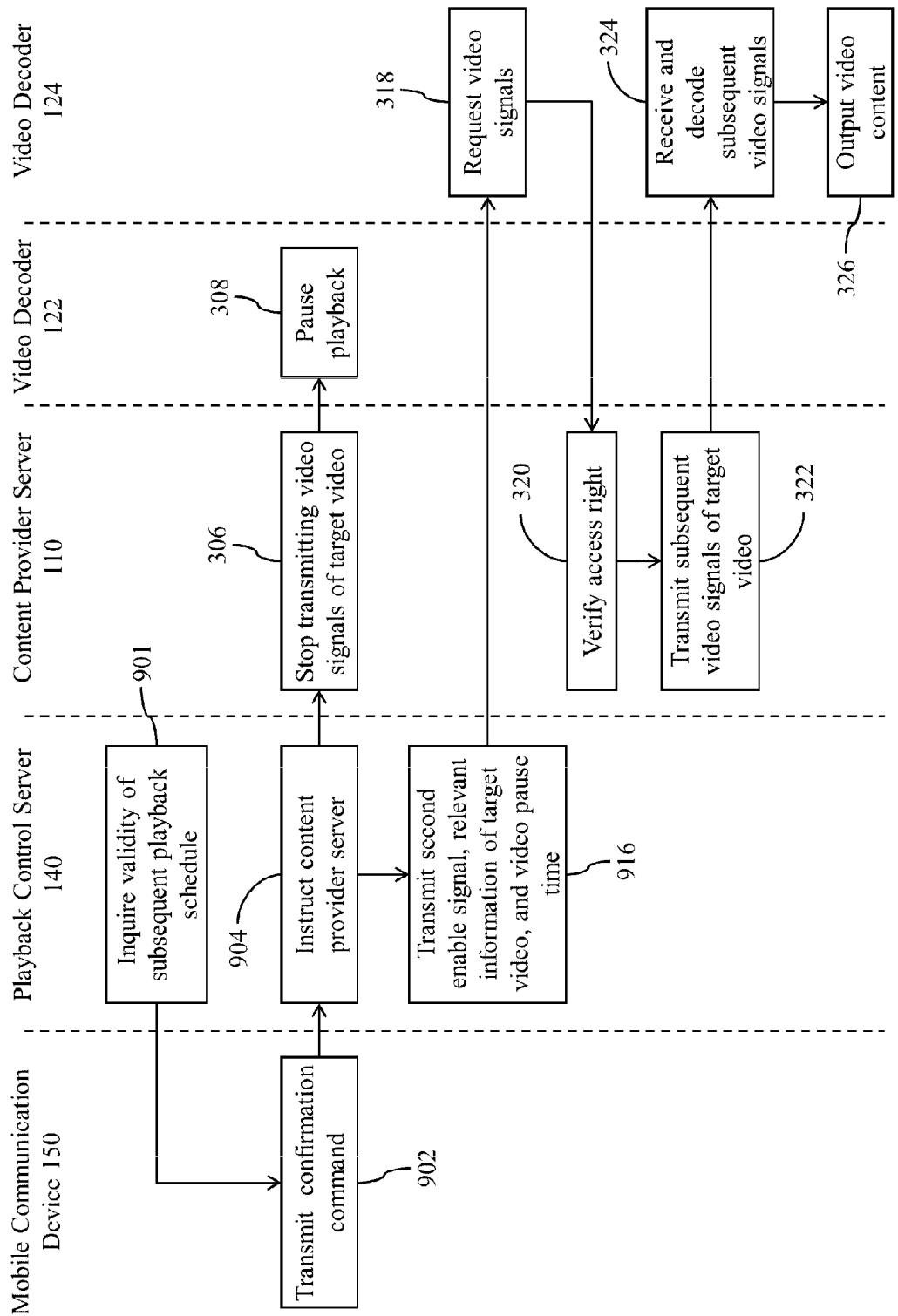

Please refer to FIG. 8 and FIG. 9, which show simplified flowcharts of a video playback control method adopted by the video playback system 100 according to a sixth embodiment of the present disclosure.

The flowchart of FIG. 8 is similar to the aforementioned flowchart of FIG. 2, and the difference between the two embodiments is in that the operation 204 in FIG. 2 is replaced by operations 804 and 805 in FIG. 8.

As shown in FIG. 8, after the playback control server 140 and the mobile communication device 150 complete the identity authentication procedure of the operation 202, the video remote control module 159 of the mobile communication device 150 requests the user to utilize the input device 157 to select a target video to be playbacked, multiple receiving devices of the video signals of the target video, and a playback schedule of the target video. After completing the aforementioned setting, the video remote control module 159 performs the operation 804 at the first time point T1 to utilize the communication circuit 155 to transmit a schedule message indicating the selected target video, the multiple receiving devices of the video signals, and the playback schedule of the target video to the playback control server 140 via the internet 180. For the purpose of explanatory convenience in the following descriptions, it is assumed herein that the schedule message indicates that the video decoder 122 is selected to playback a portion of the video content of the target video in a first time period P1, and the video decoder 124 is selected to playback the remaining portion of the video content of the target video in a second time period P2. In practical applications, the aforementioned first time period P1 and second time period P2 may be two successive periods or two discontinuous periods.

In the operation 805, the playback control module 147 of the playback control server 140 receives the schedule message transmitted from the mobile communication device 150 and records the playback schedule specified in the schedule message, so as to obtain the video pause time of the target video.

Afterwards, the playback control module 147 performs the operation 206 before the beginning of the first time period P1. In the operation 206, the playback control module 147 utilizes the communication circuit 145 to transmit the first enable signal EN1 and the relevant information of the target video to the video decoder 122 via the internet 180. Similar to the aforementioned embodiments, the aforementioned relevant information of the target video may comprise the video ID of the target video, or even comprise the purchaser information of the target video, such as the SIM card numbers of the mobile communication device 150 or the like.

Other operations in FIG. 8 are the same as the corresponding operations in FIG. 2, and thus the aforementioned descriptions regarding the operations and advantages of other operations in FIG. 2 are also applicable to the embodiment of FIG. 8.

As shown in FIG. 9, when the first playback schedule (i.e., the first time period P1 in this embodiment) specified in the aforementioned playback schedule ends, the playback control module 147 may perform an operation 901 to inquire the mobile communication device 150 about the validity of the subsequent playback schedule to make sure whether to carry on the subsequent playback schedule.

At this moment, if the user decides to continue to playback the target video with the video decoder 122 and not to follow the pre-configured playback schedule, then the video remote control module 159 of the mobile communication device 150 may transmit a revoke message to the playback control server 140 to instruct the playback control server 140 not to stop the playback of the video decoder 122 and to abort the subsequent operation specified in the pre-configured playback schedule. In other words, the operation 901 is a revoke mechanism with respect to the pre-configured playback schedule, which provides the user with more manipulation flexibilities.

On the contrary, if the user decides to follow the pre-configured playback schedule, the video remote control module 159 may perform an operation 902 to transmit a confirmation command to the playback control server 140 via the internet 180.

When the confirmation command transmitted from the mobile communication device 150 is received by the playback control module 147, the playback control module 147 may perform an operation 904 at a fourth time point T4 to instruct the content provider server 110 via the internet 180.

After the fourth time point T4, the playback control server 140 opts to utilize the video decoder 124 to receive the subsequent video signals of the target video according to the schedule message. Accordingly, the playback control module 147 may perform an operation 916 before the beginning of the second playback schedule (i.e., the second time period P2 in this embodiment) specified in the playback schedule. In the operation 916, the playback control module 147 utilizes the communication circuit 145 to transmit the second enable signal EN2, the relevant information of the target video, and the video pause time to the video decoder 124 via the internet 180. In one embodiment, the relevant information of the target video comprises the video ID of the target video. In another embodiment, the aforementioned relevant information of the target video further comprises the purchaser information of the target video, such as the SIM card numbers of the mobile communication device 150 or the like.

In this embodiment, as long as the time gap between the first time period P1 and the second time period P2 specified in the playback schedule configured by the video remote control module 159 does not exceed a predetermined time length, such as 48 hours or 72 hours, the playback control module 147 would not treat the behavior of requesting to playback the remaining portion of the target video in the second time period P2 as another chargeable purchase. Accordingly, the playback control module 147 would not instruct the billing system 170 to add another purchasing record chargeable to the user of the mobile communication device 150, and thus the user would not be charged twice for the target video by the content service provider.

Other operations in FIG. 9 are the same as the corresponding operations in FIG. 3, and thus the aforementioned descriptions regarding the operations and advantages of other operations in FIG. 3 are also applicable to the embodiment of FIG. 9.

Figure 10:
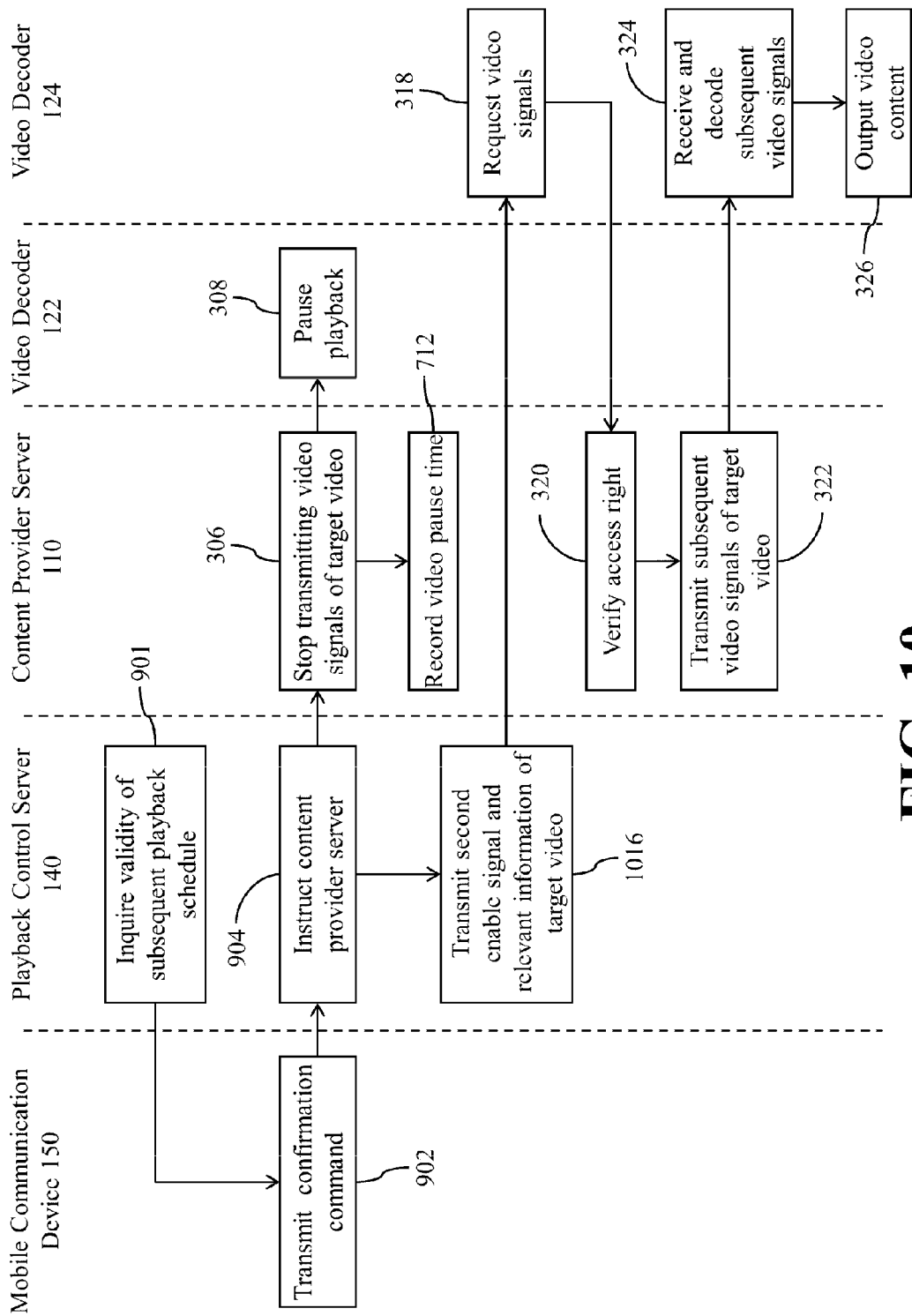
FIG. 10 shows a simplified partial flowchart illustrating a video playback control method according to a seventh embodiment of the present disclosure.

Please refer to FIG. 10, which shows a simplified partial flowchart of a video playback control method according to a seventh embodiment of the present disclosure. The flowchart of FIG. 10 is similar to the aforementioned flowchart of FIG. 9, and the differences between the two embodiments are in that the embodiment of FIG. 10 further comprises the operation 712, and the operation 916 in FIG. 9 is replaced by an operation 1016 in FIG. 10.

In the embodiment of FIG. 10, the video pause time of the target video is determined by the content provider server 110. Accordingly, when the content provider server 110 stops transmitting the video signals of the target video to the video decoder 122, the content provider server 110 further performs the operation 712 to record the video pause time of the target video and does not transmit the video pause time of the target video to the playback control server 140.

In this embodiment, the playback control server 140 also opts to utilize the video decoder 124 to receive the subsequent video signals of the target video after the fourth time point T4 according to the schedule message. Accordingly, the playback control module 147 may perform the operation 1016 before the beginning of the second playback schedule (i.e., the second time period P2 in this embodiment) specified in the playback schedule. In the operation 1016, the playback control module 147 utilizes the communication circuit 145 to transmit the second enable signal EN2 and the relevant information of the target video to the video decoder 124 via the internet 180. The relevant information of the target video may comprise the video ID of the target video, or even comprise the purchaser information of the target video, such as the SIM card numbers of the mobile communication device 150 or the like.

Other operations in FIG. 10 are the same as the corresponding operations in FIG. 3 and FIG. 9, and thus the aforementioned descriptions regarding the operations and advantages of other operations in FIG. 3 and FIG. 9 are also applicable to the embodiment of FIG. 10.

It can be appreciated from the foregoing descriptions that the video playback system 100 not only enables the same target video to be successively playbacked between the video decoders 122 and 124, but also enables the user to utilize the mobile communication device 150 to configure multiple playback schedules of the target video in advance, thereby greatly increasing the functionalities and the operational flexibility of the video playback system 100.

The executing order of the operations in each of the aforementioned flowcharts is merely an exemplary embodiment rather than a restriction to the practical implementations. For example, in the flowchart of FIG. 2, the operation 202 may be moved to between the operation 204 and the operation 206. In the flowchart of FIG. 8, the operation 202 may be moved to between the operation 604 and the operation 605. Additionally, in the flowcharts of FIG. 2 and FIG. 8, the operations 206 and 208 may be swapped or performed simultaneously. Besides, in some embodiments, the operation 212, 320, 901, or 902 may be omitted.

Furthermore, in the aforementioned descriptions, the billing system 170 updates the billing records of the mobile communication device 150 according to the instruction from the playback control module 147. This is merely an embodiment, rather than a restriction to the practical implementations. In practice, the billing system 170 may instead update the billing records of the mobile communication device 150 based on the instruction from other devices.

In the embodiment of FIG. 2, for example, the operation 208 of the playback control module 147 may be omitted. Instead, after the operation 214 the content provider server 110 may inform the billing system 170 of a purchasing record of the mobile communication device 150 with respect to the target video, so that the billing system 170 updates billing records of the mobile communication device 150 accordingly. Similarly, as long as the time difference between a time point at which the modification message transmitted from the mobile communication device 150 is received by the playback control server 140 and a time point at which the selection message transmitted from the mobile communication device 150 is received by the playback control server 140 does not exceed a predetermined time length, such as 48 hours or 72 hours, the playback control module 147 and the content provider server 110 would not treat the aforementioned modification message as another chargeable purchase. Accordingly, the content provider server 110 would not instruct the billing system 170 to add another purchasing record chargeable to the user of the mobile communication device 15, thereby avoiding a double charge to the user for the target video.

For another example, in the embodiment of FIG. 8, the operation 208 of the playback control module 147 may be omitted. Instead, after the operation 214 the content provider server 110 may inform the billing system 170 of a purchasing record of the mobile communication device 150 with respect to the target video, so that the billing system 170 updates billing records of the mobile communication device 150 accordingly. Similarly, as long as the time gap between the first time period P1 and the second time period P2 specified in the playback schedule configured by the video remote control module 159 does not exceed a predetermined time length, such as 48 hours or 72 hours, the playback control module 147 and the content provider server 110 would not treat the behavior of requesting to playback the remaining portion of the target video in the second time period P2 as another chargeable purchase. Accordingly, the playback control module 147 would not instruct the billing system 170 to add another purchasing record chargeable to the user of the mobile communication device 150, thereby avoiding a double charge to the user for the target video.

It can be appreciated from the foregoing descriptions that the user is enabled to indirectly control multiple video decoders in the video playback system 100 through the playback control server 140 by using a single mobile communication device 150. As a result, the quantity of required remote controls in the video playback system 100 can be effectively reduced. Additionally, the video playback system 100 enables the same target video to be successively playbacked by multiple video decoders, and prevents the user of the mobile communication device 150 from being charged redundantly.

In addition, as illustrated in the foregoing descriptions, in the video playback system 100, the user of the mobile communication device 150 is enabled to manipulate the video decoders 122 and 124 even if the mobile communication device 150 is located far away from the video decoders 122 and 124. Accordingly, the user of the mobile communication device 150 is not only enabled to utilize the mobile communication device 150 to control the video decoders 122 and 124 to playback desirable videos, but also enabled to remote control the video decoders 122 and 124 to playback videos for other people (e.g., family or friends) in a remote place. This capability greatly expands the functionalities and applications of the video playback system 100.

The same reference numbers may be used throughout the drawings to refer to the same or like parts, components, or operations. Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to . . . . " Also, the phrase "coupled with" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A video playback system with multiple video decoders, comprising:
　　a content provider server, configured to operably provide video signals of a target video;
　　a first video decoder, configured to operably communicate with the content provider server via internet;
　　a first display, coupled with the first video decoder and configured to operably display video content outputted from the first video decoder;
　　a second video decoder, configured to operably communicate with the content provider server via internet;
　　a second display, coupled with the second video decoder and configured to operably display video content outputted from the second video decoder;
　　a playback control server, configured to operably control the first and the second video decoders via internet; and
　　a mobile communication device, configured to operably create a pre-configured schedule to transmit a selection message for a first billable transaction to the playback control server via internet at a first time point and transmit a modification message to the playback control server via internet at a third time point;
　　wherein the playback control server opts to utilize the first video decoder to receive a portion of video signals of the target video according to the selection message and record a video pause time of the target video, and opts to utilize the second video decoder to receive subsequent video signals of the target video after the third time point according to the modification message and the video pause time, so that a portion of the target video before the video pause time is played by the first video decoder and a residual portion of the target video after the video pause time is played by the second video decoder;
　　wherein the modification message is with the first billable transaction if the third time point is within a predetermined time from the first time point, otherwise the modification message is for a second billable transaction;
　　wherein the video pause time is a pre-selected time in the target video selected by a user before the target video is being played by any device, wherein the user selects the video pause time in the pre-configured schedule, wherein the user selects the portion of the target video before the video pause time being played by the first video decoder and the residual portion of the target video after the video pause time being played by the second video decoder in the pre-configured schedule;
　　wherein the mobile communication device is further configured to operably transmit a revoke message to the playback control server if the user decides to continue to play the residual portion of the target video by the first video decoder after the pre-configured schedule is created; and wherein when the mobile communication device transmits the revoke message to the playback control server, the playback control server cancels the pre-configured schedule and keeps utilizing the first video decoder to receive the video signals of the target video.

2. The video playback system of claim 1, wherein the playback control server transmits a first enable signal and relevant information of the target video to the first video decoder after the first time point; wherein after receiving the first enable signal, the first video decoder requests the content provider server to provide the video signals of the target video.

3. The video playback system of claim 2, wherein the playback control server transmits a second enable signal and the relevant information of the target video to the second video decoder after the third time point; wherein after receiving the second enable signal, the second video decoder requests the content provider server to provide the video signals of the target video, so that the content provider server transmits the subsequent video signals of the target video to the second video decoder via internet.

4. The video playback system of claim 3, wherein the mobile communication device transmits a pause instruction to the playback control server via internet after the first time point, and the playback control server instructs the content provider server to stop transmitting the video signals of the target video to the first video decoder between the first time point and the third time point.

5. The video playback system of claim 3, wherein the mobile communication device transmits a pause instruction to the playback control server via internet after the first time point, and the playback control server records a video pause time of the target video between the first time point and the third time point.

6. The video playback system of claim 5, wherein the playback control server further transmits the video pause time to the second video decoder after the third time point; wherein the second video decoder transmits the video pause time to the content provider server when requesting the content provider server to provide the video signals of the target video.

7. The video playback system of claim 6, wherein the video pause time is directly reported to the playback control server by the first video decoder or the content provider server via internet, or reported to the content provider server by the first video decoder, and then transmitted to the playback control server by the content provider server.

8. The video playback system of claim 3, wherein the mobile communication device transmits a pause instruction to the playback control server via internet after the first time point, and the content provider server records a video pause time of the target video between the first time point and the third time point.

9. The video playback system of claim 1, wherein the first video decoder and the second video decoder are located in different spots of the same building or respectively located in different buildings.

10. A computer program product, stored in a non-transitory storage device of a playback control server, when executed by a processing circuit of the playback control server, enabling the playback control server to perform a video playback control operation, the video playback control operation comprising:

receiving a pre-configured schedule from a mobile communication device via Internet, wherein the pre-configured schedule comprises a selection message for a first billable transaction at a first time point and a modification message at a third time point;

opting to utilize a first video decoder to receive a portion of video signals of a target video from a content provider server according to the selection message and recording a video pause time of the target video; and opting to utilize a second video decoder to receive subsequent video signals of the target video from the content provider server after the third time point according to the modification message and the video pause time, so that a portion of the target video before the video pause time is played by the first video decoder and a residual portion of the target video after the video pause time is played by the second video decoder;

wherein the modification message is with the first billable transaction if the third time point is within a predetermined time from the first time point, otherwise the modification message is for a second billable transaction;

wherein the video pause time is a pre-selected time in the target video selected by a user before the target video is being played by any device, wherein the user selects the video pause time in the pre-configured schedule, wherein the user selects the portion of the target video before the video pause time being played by the first video decoder and the residual portion of the target video after the video pause time being played by the second video decoder in the pre-configured schedule;

wherein the mobile communication device is further configured to operably transmit a revoke message to the playback control server if the user decides to continue to play the residual portion of the target video by the first video decoder after the re-configured schedule is created; and wherein when the mobile communication device transmits the revoke message to the playback control server, the playback control server cancels the pre-configured schedule and keeps utilizing the first video decoder to receive the video signals of the target video.

11. The computer program product of claim 10, wherein the video playback control operation further comprises: transmitting a first enable signal and relevant information of the target video to the first video decoder after the first time point, so that the first video decoder requests the content provider server to provide the video signals of the target video.

12. The computer program product of claim 11, wherein the video playback control operation further comprises: transmitting a second enable signal and the relevant information of the target video to the second video decoder after the third time point, so that the second video decoder requests the content provider server to provide the video signals of the target video.

13. The computer program product of claim 12, wherein the video playback control operation further comprises: receiving a pause instruction transmitted from the mobile communication device via internet after the first time point; and instructing the content provider server to stop transmitting the video signals of the target video to the first video decoder between the first time point and the third time point.

14. The computer program product of claim 12, wherein the video playback control operation further comprises: receiving a pause instruction transmitted from the mobile communication device via internet after the first time point;

and recording a video pause time of the target video between the first time point and the third time point.

15. The computer program product of claim 14, wherein the video playback control operation further comprises: transmitting the video pause time to the second video decoder after the third time point.

16. The computer program product of claim 15, wherein the video pause time is directly reported to the playback control server by the first video decoder or the content provider server via internet, or reported to the content provider server by the first video decoder, and then transmitted to the playback control server by the content provider server.

17. A video playback system with multiple video decoders, comprising:
   a content provider server, configured to operably provide video signals of a target video;
   a first video decoder, configured to operably communicate with the content provider server via internet;
   a first display, coupled with the first video decoder and configured to operably display video content outputted from the first video decoder;
   a second video decoder, configured to operably communicate with the content provider server via internet;
   a second display, coupled with the second video decoder and configured to operably display video content outputted from the second video decoder;
   a playback control server, configured to operably control the first and the second video decoders via internet; and
   a mobile communication device, configured to operably transmit a schedule message for a first billable transaction to the playback control server via internet at a first time point;
   wherein the playback control server opts to utilize the first video decoder to receive a portion of video signals of the target video according to the schedule message and record a video pause time of the target video, and opts to utilize the second video decoder to receive subsequent video signals of the target video after a fourth time point according to the schedule message and the video pause time, so that a portion of the target video before the video pause time is played by the first video decoder and a residual portion of the target video after the video pause time is played by the second video decoder;
   wherein receiving subsequent video signals of the target video after the fourth time point according to the schedule message is not treated as a second billable transaction by the playback control server if the fourth time point is within a predetermined time from the first time point;
   wherein the video pause time is a pre-selected time in the target video selected by a user before the target video is being played by any device, wherein the user selects the video pause time in the schedule message, wherein the user selects the portion of the target video before the video pause time being played by the first video decoder and the residual portion of the target video after the video pause time being played by the second video decoder in the schedule message;
   wherein the mobile communication device is further configured to operably transmit a revoke message to the playback control server if the user decides to continue to play the residual portion of the target video by the first video decoder after the schedule message is created; and
   wherein when the mobile communication device transmits the revoke message to the playback control server, the playback control server cancels the schedule message and keeps utilizing the first video decoder to receive the video signals of the target video.

18. The video playback system of claim 17, wherein the playback control server transmits a first enable signal and relevant information of the target video to the first video decoder after the first time point; wherein after receiving the first enable signal, the first video decoder requests the content provider server to provide the video signals of the target video.

19. The video playback system of claim 18, wherein the playback control server transmits a second enable signal and the relevant information of the target video to the second video decoder after the fourth time point; wherein after receiving the second enable signal, the second video decoder requests the content provider server to provide the video signals of the target video, so that the content provider server transmits the subsequent video signals of the target video to the second video decoder via internet.

20. The video playback system of claim 19, wherein the playback control server instructs the content provider server to stop transmitting the video signals of the target video to the first video decoder at the fourth time point.

21. The video playback system of claim 19, wherein the playback control server further transmits a video pause time to the second video decoder after the fourth time point; wherein the second video decoder transmits the video pause time to the content provider server when requesting the content provider server to provide the video signals of the target video.

22. The video playback system of claim 19, wherein the content provider server records a video pause time of the target video after the fourth time point.

23. The video playback system of claim 17, wherein the first video decoder and the second video decoder are located in different spots of the same building or respectively located in different buildings.

24. A computer program product, stored in a non-transitory storage device of a playback control server, when executed by a processing circuit of the playback control server, enabling the playback control server to perform a video playback control operation, the video playback control operation comprising:
   receiving a schedule message for a first billable transaction transmitted from a mobile communication device via internet at a first time point;
   opting to utilize a first video decoder to receive a portion of video signals of a target video from a content provider server according to the schedule message and recording a video pause time of the target video; and
   opting to utilize a second video decoder to receive subsequent video signals of the target video from the content provider server after a fourth time point according to the schedule message and the video pause time, so that a portion of the target video before the video pause time is played by the first video decoder and a residual portion of the target video after the video pause time is played by the second video decoder;
   wherein receiving subsequent video signals of the target video after the fourth time point according to the schedule message is not treated as a second billable transaction by the playback control server if the fourth time point is within a predetermined time from the first time point;
   wherein the video pause time is a pre-selected time in the target video selected by a user before the target video is being played by any device, wherein the user selects the video pause time in the schedule message, wherein the user selects the portion of the target video before the video pause time being played by the first video decoder and the residual portion of the target video after the video pause time being played by the second video decoder in the schedule message;

wherein the mobile communication device is further configured to operably transmit a revoke message to the playback control server if the user decides to continue to play the residual portion of the target video by the first video decoder after the schedule message is created; and wherein when the mobile communication device transmits the revoke message to the playback control server, the playback control server cancels the schedule message and keeps utilizing the first video decoder to receive the video signals of the target video.

25. The computer program product of claim 24, wherein the video playback control operation further comprises: transmitting a first enable signal and relevant information of the target video to the first video decoder after the first time point, so that the first video decoder requests the content provider server to provide the video signals of the target video.

26. The computer program product of claim 25, wherein the video playback control operation further comprises: transmitting a second enable signal and the relevant information of the target video to the second video decoder after the fourth time point, so that the second video decoder requests the content provider server to provide the video signals of the target video.

27. The computer program product of claim 26, wherein the video playback control operation further comprises: instructing the content provider server to stop transmitting the video signals of the target video to the first video decoder at the fourth time point.

28. The computer program product of claim 26, wherein the video playback control operation further comprises: transmitting a video pause time to the second video decoder after the fourth time point.

\* \* \* \* \*